United States Patent

[11] 3,590,575

| [72] | Inventor | James H. Eckenrode<br>Millersville, Pa. |
|---|---|---|
| [21] | Appl. No. | 9,287 |
| [22] | Filed | Feb. 6, 1970 |
| [45] | Patented | July 6, 1971 |
| [73] | Assignee | Hamilton Watch Company<br>Lancaster, Pa. |

[54] OILLESS SHOCKPROOF BEARING FOR TIMEPIECES
8 Claims, 4 Drawing Figs.

[52] U.S. Cl. .................................................. 58/140
[51] Int. Cl. ...........................................G04b 13/02,
G04b 31/00
[50] Field of Search............................................58/140, 140
A, 152 L; 308/159, 163

[56] References Cited
UNITED STATES PATENTS

| 2,459,598 | 1/1949 | Stott............................. | 58/152 X |
| 2,613,119 | 10/1952 | Seemann...................... | 58/152 X |
| 2,700,273 | 1/1955 | Godat........................... | 58/140 |
| 2,827,758 | 3/1958 | Vojmard...................... | 58/140 |
| 2,956,394 | 10/1960 | Dubois......................... | 58/140 |
| 3,306,027 | 2/1967 | Schneider..................... | 58/140 |

FOREIGN PATENTS

| 1,055,099 | 10/1953 | France......................... | 58/152 |
| 1,306,732 | 9/1962 | France......................... | 58/140 |

*Primary Examiner*—Richard B. Wilkinson
*Assistant Examiner*—Stanley A. Wal
*Attorney*—Le Blanc & Shur ABSTRACT: The device of this invention is a molded bearing of self-lubricating material utilized in construction of a shockproof block for timepieces. The bearing in a preferred embodiment may be substituted for the conventional hole jewel, endstone, and setting in a shockproof balance block to form a durable oilless bearing for the balance staff. The bearing surrounds the end of the balance staff and incorporates an internal rounded surface to provide a point contact side bearing and a flat internal surface adjacent the end of the staff to control endshake between bearings. The upper external surface of the bearing is rounded and adapted to abut a conventional spring normally utilized to bias an endstone. A die utilized to fabricate the bearing is also described.

PATENTED JUL 6 1971
3,590,575
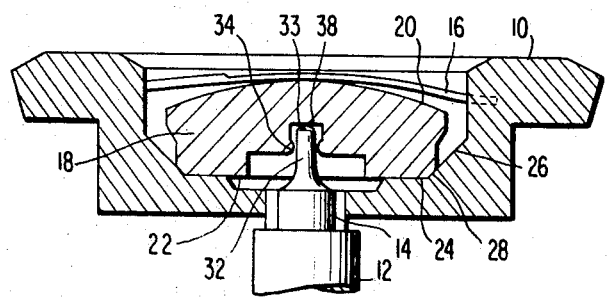
FIG. 1
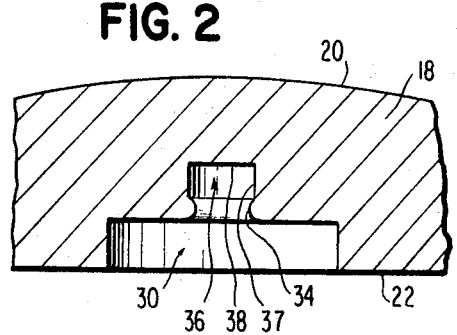
FIG. 2
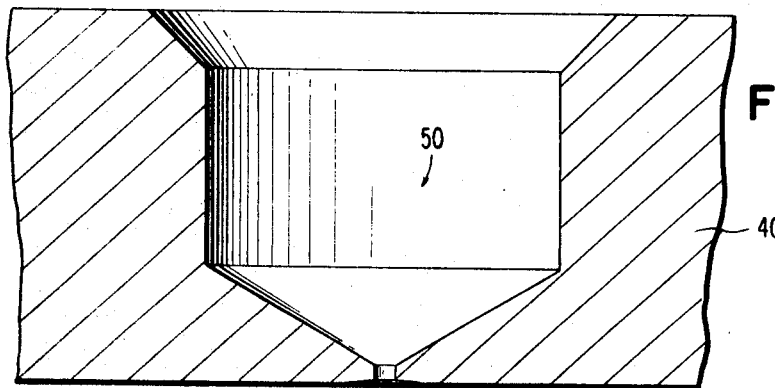
FIG. 3
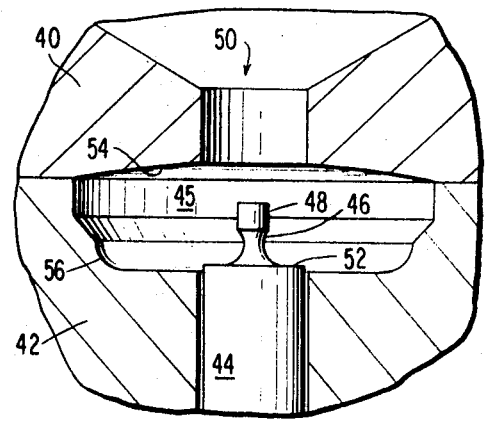
FIG. 3A
INVENTOR
JAMES H. ECKENRODE
BY Le Blanc & Shur
ATTORNEYS
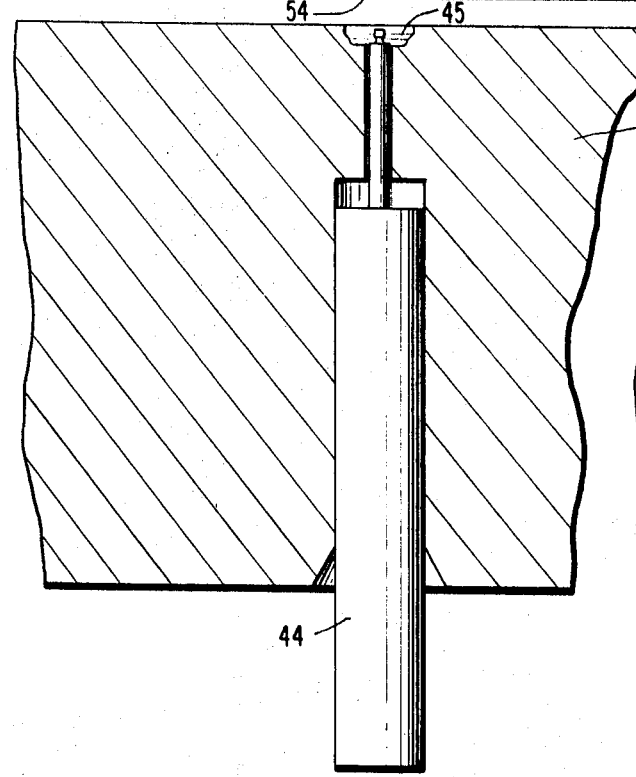

OILLESS SHOCKPROOF BEARING FOR TIMEPIECES

The conventional shockproof staff bearing normally consists of an apertured stone or hole jewel which surrounds the end of the staff or shaft pin. This jewel is loosely supported by a bushing or setting. An endstone, normally supported by the setting, covers the end of the shaft. The face of the endstone adjacent the shaft end is flat and may rest on the setting. The upper surface of the endstone is normally rounded, having a convex curvature, and a spring adapted to cover the curved surface biases movement of the bearing parts and returns them elastically to their original position following a shock. Such a conventional bearing is described in U.S. Pat. No. 2,721,443.

Under shock the staff will ride against the endstone or sidewalls of the hole jewel, and to reduce frictional wear between the said parts, the hole jewel includes an oil cup surrounding the shaft end, and the endstone and the jewel are spaced to provide an oil reservoir for the cup.

The use of oil, however, creates a variety of problems. During normal operation, the oil will break down and run off due to capillary action. Excessive wear then results and, ultimately, stoppage.

Repair or replacement of the shockproof block following stoppage is time-consuming and expensive. The incidences of such stoppages renders timepieces having jeweled, shockproof bearings relatively unreliable.

Prior attempts to fabricate oilless bearings have also created difficulties. Although oilless or self-lubricating materials are well known the use has proven impractical due to the fact that such bearings normally incorporate a cylindrical hollow portion to receive the balance staff. The shape of this hollow portion, necessitated by fabrication methods, provides an undesirable peripheral contact throughout the area of the staff enclosed by said bearing as compared to the point contact achieved with the rounded internal surface of the aperture in a hole jewel. The use of a self-lubricating material in a shaft bearing in place of a hole jewel to avoid the need for oil has, in prior device, unduly influenced the movement energy requirement through excessive and undesirable contact between the bearing and the balance shaft.

Accordingly, it is an object of this invention to provide an oilless shaft bearing for timepieces.

It is another object of this invention to provide a shaft bearing constructed of a self-lubricating material adapted to replace the conventional hole jewel, endstone and setting in a shockproof block.

It is another object to provide an inexpensive bearing for a balance staff wherein the staff receiving aperture comprises a hyperboloid of one sheet with a circular lateral cross section for minimal point contact with the staff.

It is a further object to provide a durable, self-lubricating molded bearing for use in a shockproof block adaptable to replace a conventional hole jewel, endstone, and setting to provide an inexpensive and efficient bearing for a shockproof mounting.

It is still another object to provide a method of fabricating a molded, self-lubricating bearing for a timepiece with a staff-receiving aperture having the configuration of a hyperboloid of one sheet.

These and other objects and advantages of the invention will become more apparent upon reference to the following specification, claims, and appended drawings, wherein:

FIG. 1 is a cross-sectional view of a shockproof block with the self-lubricating bearing of this invention;

FIG. 2 is a partial view, in section, of the bearing of this invention;

FIG. 3 is a cross-sectional view of the die which may be utilized to fabricate the bearing of this invention with the parts thereof shown in exploded juxtaposition immediately prior to assembly; and FIG. 3A is a fragmentary, cross-sectional view of the die of FIG. 3 following assembly. With attention to the drawings and particularly FIGS. 1 and 2, the shockproof block of this invention includes a casing 10 adapted to receive a shaft 12, which may be the balance staff, and which terminates in a pin 14. The casing mounts a spring 16. The configuration of spring 16 and casing 10 need not be limited to that of FIG. 1, may include that of any well-known shockproof block. As will be hereinafter pointed out, the bearing of this invention is adapted to be utilized in any conventional casing.

The bearing member 18 has a rounded upper surface 20. The curvature of upper surface 20 is similar to that of a conventional endstone and adapted to abut the lower surface of spring 16 when bearing 18 is disposed within the hollow interior of casing 10.

The lower external surface 22 of bearing 18 is substantially flat to rest on the interior base portion 24 of casing 10. Casing 10 utilizes a sloping sidewall 26 to center the bearing member 18 and the said bearing has a correspondingly chamfered surface 28.

With attention to FIG. 2, bearing 18 includes a hollow aperture 30 for receiving the terminal portion 32 of pin 14. Aperture 30 incorporates a curved sidewall 34. Wall 34 in cross section is essentially the surface of a hyperbola, and the wall surface corresponds to that surface remaining upon the removal of a hyperboloid of one sheet. A horizontal cross section will exhibit a circular surface while a vertical cross section, as shown in FIG. 2, exhibits a hyperbola. The dimensions of wall 34 are similar to those of a conventional hole jewel and the wall 34 functions as a point contact side bearing for pin 32.

Aperture 30 of bearing 18 further includes an interior recess 36. Recess 36 is substantially cylindrical and is designed to receive the rounded end 33 of pin 32. Sidewalls 37 of recess 36 join rounder sidewalls 34 and recess 36 terminates in a substantially flat end surface 38.

Surfaces 38 and 34 of bearing 18 function respectively to replace the conventional endstone and hole jewel, and thereby provide bearing 18 with the capability to take up axial and lateral shocks imparted to the block without damage to the shaft 12.

Axial shock imparted to the block will cause the flat end surface 38 of recess 36 to abut the terminal portion 33 of pin 14 in a manner similar to an endstone.

A lateral shock imparted to the block causes the displacement of the terminal portion 32 of pin 14 laterally against surface 34 of bearing 18.

Spring 16 cooperates with centering surface 26 of casing 10 to elastically return bearing member 18 to its original position following shock and thereby allows the block to give with either axial or lateral shock.

The bearing of this invention may be constructed from any well known self-lubricating material and preferably is molded. Any tough plastic or Teflon may be used, or any well known metallic alloy may be cast in the desired configuration.

FIGS. 3 and 3A show a die which may be utilized to mold the bearing of this invention. The die consists of an upper member 40, a lower member 42, and a die pin 44.

Pin 44 extends into the die cavity 45 when the die is assembled and is utilized to form aperture 30, surface 34, and recess 36 with surface 38 in the bearing 18. Accordingly, pin 44 has a circumferential indentation 46 which describes a hyperboloid of one sheet and a cylindrical end 48.

Molten material is poured into the cavity entrance 50 in a conventional manner and allowed to solidify to form the bearing member 18. Following solidification, the die is disassembled to remove the molded bearing member.

It will be obvious to those skilled in the art that the dimensions and tolerances of the die cavity 45 and of the bearing 18 are important and may be varied according to well known procedures to accommodate different types of shaft pins and mounting blocks.

Bearings have been molded with success in the die of FIGS. 3 and 3A wherein the curvature of indentation 46 of pin 44 had a radius of 0.0030±5 inches, and cylindrical portion 48 of pin 44 had a diameter of 0.0041±2 inches. The height of cylindrical portion 48 was 0.0038±5 inches and the overall height of the distal portion of pin 44 from shoulder 52 to the end was 0.0085±3 inches. Therefore, the length to width ratio of that portion of pin 44 extending into the die cavity 45 was less than 2.1 at the width of the cylindrical portion 48 and greater than 3.0 at the narrowest width of indentation 46, with a ratio width to width, lesser to greater, of about 0.76, or taking into account tolerances of ±0.0002 inches in the dimensions, between about 0.67 and 0.85. In addition, interior curved surface 54 of upper die member 40 was dimensioned on a radius of 0.140 ±5 inches to form upper surface 20 of bearing 18 when the overall width of the bearing was 0.0512±5 inches.

Centering chamfer 28 on bearing 18 corresponds to a bevelled surface 56 having a depth of 0.0043±3 inches and a radius of curvature of 0.0035 inches to form a bearing having a maximum height of 0.00149±3 inches and a maximum width of 0.00512±5 inches.

Bearings of this invention designed according to similar specifications have been tested extensively. For example, three watch movements with such bearings used as balance bearings were tested over a 9-month period or for 6,480 hours of operation without oil. Balance motion was found to be as good or better than conventional movements with ruby bearings and oil.

The bearing of this invention as hereindescribed provides an economical and reliable substitute for the conventional jewelled bearings normally utilized in shockproof timepieces. The bearing is a single component which functions similar to the conventional endstone, hole jewel, and setting with the exception that the bearing of this invention does not require oil. It will be obvious to those skilled in the art that the bearing of this invention is intended to be used in a variety of timepieces within the scope of this invention, and that the specific use with a balance staff to form a shockproof balance block as disclosed is a preferred embodiment intended to illustrate and not restrict the scope of this invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to be secured by United States Letters Patent is:

1. A self-lubricating shock-absorbing bearing for a timepiece comprising a bearing body having a cavity, a movable pivot-supporting means disposed within said cavity, said supporting means having a pivot-receiving recess, a lower portion of said recess describing a hyperboloid of one sheet and an upper portion of said recess describing a cylinder, and resilient means holding said supporting means in said cavity.

2. The bearing of claim 1 wherein the upper surface of said supporting means described a convex curve and said resilient means is a concave spring member peripherally attached to said bearing body, and a central portion of said spring member abutting the upper surface of said supporting means and urging said means into the cavity.

3. The bearing of claim 2 wherein the lower surface of said supporting means abuts the lower surface of the cavity in said bearing body, said lower surface of the cavity having an annular frustoconical centering surface, the lower surface of said supporting means having a peripheral chamfer, the chamfer on said supporting means abutting the annular centering surface in said bearing body so that a shock imparted to said movable supporting means will displace said means against said spring member, said spring member adapted to resiliently retain said supporting means within the cavity and urge said means against said centering surface.

4. The bearing of claim 1 wherein the supporting means comprises a unitary, self-lubricating, molded body having a lower pivot-receiving recess, a portion of the sidewalls of said recess describing a hyperbola in longitudinal cross section and a circle in lateral cross section, the endwall of said recess being substantially flat and disposed perpendicularly to the longitudinal axis of said recess.

5. The molded body of claim 4 wherein the hyperbolic sidewall of said pivot-receiving recess has a minimum diameter and a maximum diameter, the ratio of said minimum to maximum diameters being from 0.67 to 0.85.

6. The bearing of claim 5 wherein the pivot-receiving recess of said molded body has a minimum to maximum diameter ratio between said sidewalls of about 0.76.

7. The molded body of claim 5 wherein the pivot-receiving recess has a length to minimum width ratio of from about 2.4 to about 3.1.

8. The molded body of claim 5 wherein the pivot-receiving recess has a length to minimum width ratio of about 2.7.